United States Patent [19]

Davidson

[11] 4,282,753

[45] Aug. 11, 1981

[54] COMBINATION ABSOLUTE AND DIFFERENTIAL TEMPERATURE SYSTEM

[75] Inventor: William A. Davidson, Evanston, Ill.

[73] Assignee: The United States of America as represented by the Secretary of Transportation, Washington, D.C.

[21] Appl. No.: 135,370

[22] Filed: Mar. 31, 1980

[51] Int. Cl.³ .............................................. G01K 7/18
[52] U.S. Cl. .................................. 73/342; 73/362 AR
[58] Field of Search ............................. 73/342, 362 AR

[56] References Cited

U.S. PATENT DOCUMENTS

| | | | |
|---|---|---|---|
| 3,181,364 | 5/1965 | Barton | 73/342 |
| 3,882,725 | 5/1975 | Rao et al. | 73/342 |
| 3,950,991 | 4/1976 | Grass | 73/342 |
| 4,143,549 | 3/1979 | Koehler | 73/342 |
| 4,201,088 | 5/1980 | Trietley, Jr. | 73/342 |

*Primary Examiner*—Donald O. Woodiel
*Attorney, Agent, or Firm*—Herbert E. Farmer; Harold P. Deeley, Jr.

[57] ABSTRACT

The measurement of small differential temperatures over a wide range of absolute temperatures is accomplished by cyclically switching the excitation polarity to a bridge circuit including the temperature sensors. Additionally, the measuring circuitry includes a differential-differential amplifier configuration and a pair of compensating conductors in the cable to each sensor to achieve equal resistance in each excitation path.

10 Claims, 1 Drawing Figure

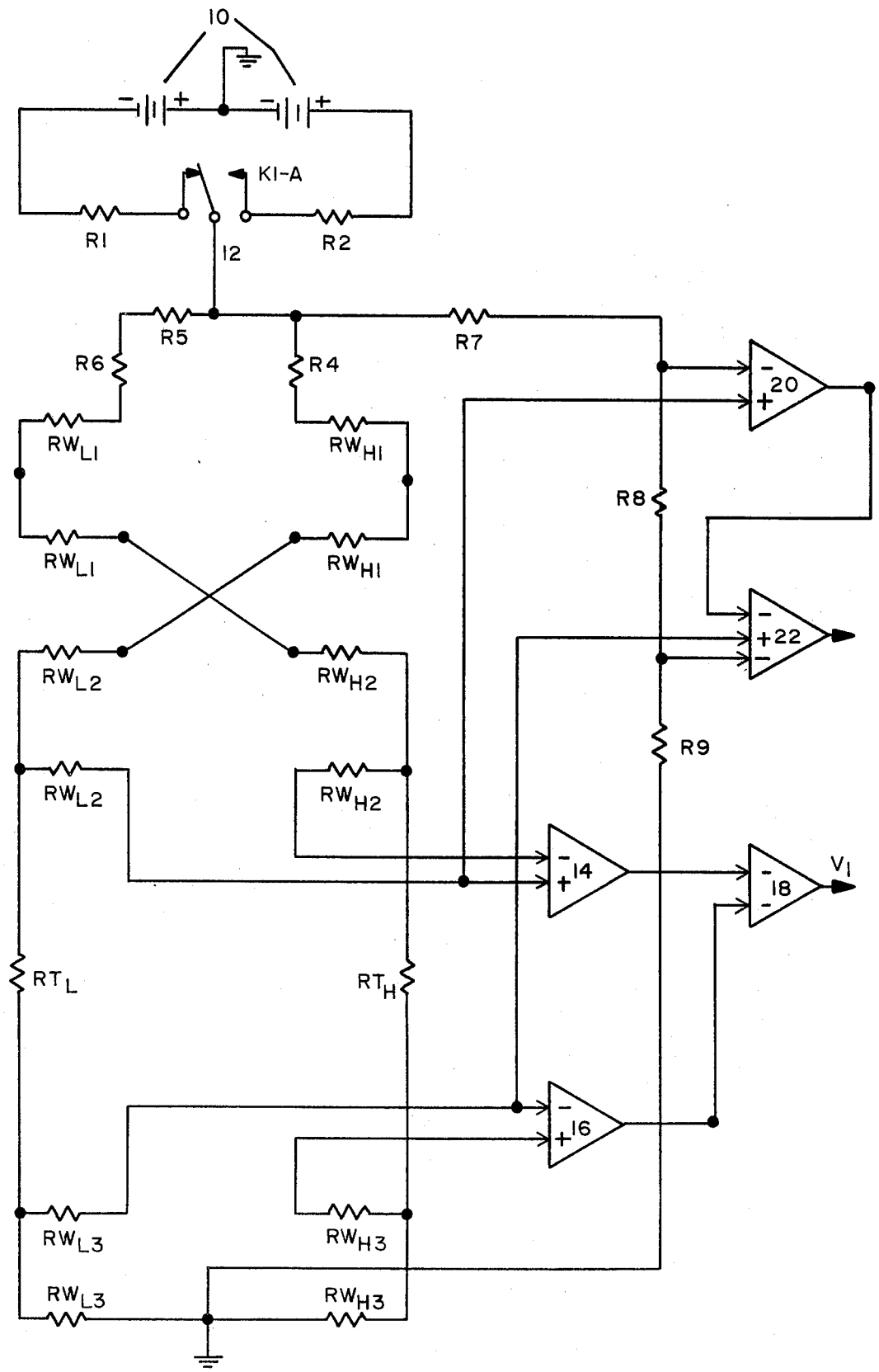

COMBINATION ABSOLUTE AND DIFFERENTIAL TEMPERATURE SYSTEM

ORIGIN OF THE INVENTION

The invention described herein was made in the course of, or under, a contract with the U.S. Department of Transportation and may be manufactured and used by or for the Government for governmental purposes without the payment of any royalties thereon or therefor.

BACKGROUND OF THE INVENTION (1) Field of the Invention

The present invention relates to temperature measurement and particularly to the measurement of small differential temperatures between widely-spaced points. More specifically, this invention is directed to a system for simultaneously measuring both differential and absolute temperatures. Accordingly, the general objects of the present invention are to provide novel and improved methods and apparatus of such character.

(2) Description of the Prior Art

While limited thereto in its utility, the present invention is particularly well suited for providing accurate information from which the atmospheric "lapse rate", or vertical temperature gradient, can be computed. For this purpose, the difference in temperature between two points vertically separated by, for example, 100 feet is measured. This temperature differential, which is generally quite small—i.e., on the order of tenths of a C°—may be of interest for several reasons. By way of example only, the strength and decay rate of the wake vortices produced by a fixed-wing aircraft during landing or take off will be affected by the temperature "lapse rate". Knowledge of wake-vortex strength and position is of interest to flight controllers since the separation which must be maintained between landing and departing aircraft is a function of this information.

In a typical wake-vortex monitoring system, a pair of temperature sensors will be positioned on towers at points vertically separated by 50 to 150 feet and the difference in temperature between the two separated points will be continuously monitored. As noted above, this atmospheric temperature difference is minute. Accordingly, in order to obtain accurate "lapse rate" information, the "equivalent temperature" errors introduced by the measuring system must be made extremely small so as to have a negligible effect. Additionally, the accuracy of the measurement system must be maintained over a wide range of atmospheric temperatures such as, for example, from −30° C. to +50° C.

Previously proposed atmospheric-temperature-gradient measuring systems have been plagued by inaccuracies arising from such factors as amplifier offset and drift, differences in signal attentuation between the spaced sensors, and other errors introduced by the differential-temperature-computation circuitry. Accordingly, it has not been previously possible to accurately and reliably measure minute atmospheric temperature gradients for demanding applications such as aircraft wake-vortex monitors.

SUMMARY OF THE INVENTION

The present invention overcomes the above briefly discussed deficiencies and disadvantages of the prior art by providing a novel and improved technique for simultaneously measuring both very small temperature differences and absolute temperatures. Apparatus for practicing this novel method includes a matched pair of temperature-sensitive resistance elements, or sensors, which are respectively located at the two spaced points between which the temperature differential is to be measured. These sensors are electrically connected through cables into adjacent arms of a bridge circuit. The remaining two arms of the bridge circuit are defined by a pair of identical, highly stable fixed resistors having resistance values substantially larger than the maximum resistances of the sensors, so the current flow through both the fixed resistors and the sensors will be essentially constant. To maintain the currents through the two sensors virtually identical in spite of different cable lengths and resistances, and variations in these cable resistances with changes in ambient temperature, each sensor cable contains an additional pair of compensating conductors of the same gauge and material as the pair providing current connections to the sensor. These conductor pairs are joined at the sensor end and connected in series with the fixed bridge resistor thereby establishing the current through the other sensor. The terminals of the sensors which are at the higher potential are coupled to the inputs of a first differential amplifier. The terminals at the opposite side of the sensors are similarly connected to the inputs of a second differential amplifier. The output signals from these first and second differential amplifiers are delivered as the inputs to a third amplifier which sums these two signals. The gain polarities and gain matching of these amplifiers is arranged such that the output signal from the third (summing) amplifier is proportional to only the difference in the voltage drops across the two sensors.

Inaccuracies attributable to slowly varying spurious "dc" voltages—such as those arising from thermoelectric junction effects and amplifier offset drift—are eliminated by periodically reversing the polarity of the potential exciting the bridge circuit which includes the sensors. The temperature difference of interest is then determined by measuring the peak-to-peak value of the square-wave signal which will appear at the output of the third amplifier.

The measurement of absolute temperature is achieved through the use of a separate, but functionally equivalent, amplifier configuration which compares the potential drop across one of the sensors with that across a stable fixed resistance in a separate half bridge.

BRIEF DESCRIPTION OF THE DRAWING

The present invention may be better understood, and its numerous objects and advantages will become apparent to those skilled in the art, by reference to the accompanying drawing which depicts a functional equivalent circuit of apparatus in accordance with a preferred embodiment.

DESCRIPTION OF THE PREFERRED EMBODIMENT

With reference now to the drawing, and presuming that the system is intended for the measurement of an atmospheric temperature difference between a pair of vertically spaced points, the lower of a matched pair of temperature-sensitive resistor elements is indicated at $RT_L$, while the upper of this pair of temperature sensors is indicated at $RT_H$. In accordance with a preferred embodiment, the resistance elements $RT_L$ and $RT_H$ are platinum resistance thermometers having, in one reduction to practice, a resistance, $R_O$, of 100 ohms±0.25% at 0° C. At other temperatures, the resistance of each of the platinum resistance elements can be accurately approximated by:

$$R = R_O(1 + AC - BC^2) \quad (1)$$

where C is temperature in °C., A is a constant equal to about 0.003995, and B is a constant equal to about $5.9 \times 10^{-7}$. In practice, over the temperature range of interest, the $BC^2$ term is negligible and, thus, the resistance of the variable resistors $RT_L$ and $RT_H$ can be adequately approximated by:

$$R = R_O(1 + AC) \quad (2)$$

The temperature sensors, accordingly, have a constant temperature coefficient of resistance of about 0.4% per C°. This is equivalent to a variation of resistance with temperature of 0.004 ohms per 0.01 C°, and 0.0004 ohms per 0.001 C°.

A current is passed through each sensor to develop a voltage signal proportional to its resistance. To yield the identical sensor voltage sensitivities (i.e., temperature coefficient of signal voltage) necessary for precise measurement of small differential temperatures, the two sensor currents must be identical; and to maintain constant voltage sensitivity over the full temperature range, these currents must be constant. The vital current matching is achieved by exciting sensors $RT_L$ and $RT_H$ respectively through matched resistors R4 and R6, from the same voltage source. The excitation currents are maintained essentially constant by making the resistances of R4 and R6 stable, and very much larger than the maximum sensor resistance, and by using a stable excitation voltage. The resulting circuit configuration of $RT_L$, $RT_H$, R4 and R6 is commonly called a bridge, and will be referred to as such henceforth.

While large sensor currents would be desirable from the standpoint of generating large voltage drops, thereby minimizing the effects of noise and the amount of subsequent amplification required, a high current will cause larger self-heating of the sensors and, thus, inaccurate measurement unless the dissipation characteristics of the two sensors are identical. Accordingly, in order to produce usable voltage signals while causing negligible self-heating error, sensor currents of about 1 milliampere were employed in one reduction to practice of the preferred embodiment of the present invention. A 1-milliampere current will produce, in the disclosed embodiment, a sensor voltage change of approximately 4 microvolts per 0.01 C°, and 0.4 microvolts per 0.001 C°.

In view of the very small voltage equivalent (4 μv) of the 0.01 C° permissible system error, it is necessary to obviate the effects of amplifier offset voltage drift and thermoelectrically generated junction voltages. In the disclosed embodiment of the invention this was achieved by cyclically switching the bridge excitation voltage between, in the example being discussed, +15 volts and −15 volts and then employing the peak-to-peak value of the square wave signal thus produced at the output of the measuring circuit as the measure of temperature differential. The cyclic switching of the polarity of the excitation voltage applied to the bridge circuit is accomplished by means of a relay K1. This relay alternately connects the bridge-excitation terminal 12 to either the − or + terminal of voltage source 10, via either of relay-protection resistors R1 and R2. In one reduction to practice of the invention, the switching was done at five cycles per second and K1 was a "zero-bounce" relay having mercury-wetted contacts.

The temperature sensors $RT_L$ and $RT_H$ are, typically, located at different elevations on a tower and, thus, must be connected to the remainder of the measurement circuitry by means of conductors having substantial and, generally, different lengths. The resistances of these conductors and the voltage drops across them (due to passage of the excitation currents) are very much larger, respectively, than the changes in sensor resistance and voltage resulting from a temperature change of 0.01 C°. Consequently, if a simple bridge/differential-amplifier arrangement were used to develop the differential-temperature voltage signal, it would be necessary for the corresponding conductors (including their connectors) to the sensors to be matched such that all variations (e.g., due to changes in temperature, stress, contact resistance, etc.) in their resistances and voltage drops not differ by more than about 0.0004 ohm and 0.4 microvolt respectively. The need for such totally impractical, if not impossible, conductor matching is obviated by employing "four-terminal" connections to the sensors and a differential-differential-amplifier configuration.

Referring again to the drawing, the resistance of each conductor of a twisted pair cable connected to a first end of temperature sensor $RT_L$ is indicated schematically by resistance $RW_{L2}$. Similarly, the resistance of each of the two conductors of a cable connected to the corresponding end of temperature sensor $RT_H$ is represented schematically by resistance $RW_{H2}$. The resistances of the conductors of the two-conductor cables connected to the second, or "grounded", ends of temperature sensors $RT_L$ and $RT_H$ are indicated schematically as resistors pairs $RW_{L3}$ and $RW_{H3}$ respectively. The potentials at first (higher potential) ends of the sensors $RT_L$ and $RT_H$ are respectively applied to the positive and negative input terminals of a first differential amplifier 14 through the first conductors which respectively have resistances schematically indicated at $RW_{L2}$ and $RW_{H2}$. The opposite or second lower-potential ends of sensors $RT_L$ and $RT_H$, i.e., the ends that are connected to ground in the disclosed embodiment, are respectively connected to the negative and positive input terminals of a second differential amplifier 16 respectively through the conductors having resistances schematically indicated at $RW_{L3}$ and $RW_{H3}$ respectively.

Since the amplifier input impedances are extremely high compared to these cable resistances, amplifiers 14 and 16 will respectively provide output signals having a magnitude and polarity commensurate with the differences respectively between the voltages at the first and second ends of sensors $RT_L$ and $RT_H$. However, because of the operation of the relay K1, these output signals also will cyclically swing between negative and positive values and therefore approximate square waves.

The output voltages from amplifiers 14 and 16 are applied as the inputs to an inverting summing amplifier 18. When amplifiers 14 and 16 have identical voltage gains, and both inputs of amplifier 18 experience identical voltage gains, the peak-to-peak value of the resulting square-wave signal provided at the output of amplifier 18 is proportional to the difference in voltage drops across just the sensors, and is independent of the voltage drops across the cable (and connector) resistances.

The temperature differentials of interest are to be measured by the present invention over a rather wide range of ambient temperatures. Thus, any mismatching of the sensor voltage sensitivities could result in significant differential measurement error at opposite ends of the temperature range of interest. To minimize such an error, a "calibration" resistor R5 is included in series with R6 to permit compensation for any residual mismatching of the sensor temperature coefficients of resistance and/or the resistances of R4 and R6, plus leads. The value of resistor R5 is selected to set the current through $RT_H$ such that the product of each sensor's current and resistance temperature coefficient equals that of the other within 0.0025%. To assure that this can be achieved, the sensor having the higher temperature coefficient of resistance is used for $RT_H$, and the fixed resistor (of the matched pair R4, R6) having the lower resistance is used for R6. For this matching to be meaningful, it is important that any subsequent changes in the currents through the sensors due to changes in sensor or lead resistances not differ by more than 0.0025%. Since the platinum resistance thermometers employed in the preferred embodiment of the invention track very accurately, the system requirement is that any changes in lead resistance to the two sensors must not differ by more than 0.0025% of the approximately 15100-ohm total, or about 0.38 ohms. Since the sensor cables may differ in length by as much as 150 feet (i.e., 300 feet of current-carrying conductors), their *changes* in resistance over the full temperature range could easily *differ* by far more (using #22 copper conductors) than this 0.38-ohm limit. This source of error is virtually eliminated by including in each sensor cable an additional pair of compensating conductors (same gauge and material as others), designated $RW_{L1}$ and $RW_{H1}$, which are joined at the sensor end and connected (at the other end) in series with the other sensor. By this means, the total length of conductor in series with each sensor is the same, regardless of the differences in cable lengths.

In accordance with the present invention, absolute temperatures are measured by employing a separate differential-differential-amplifier configuration, composed of amplifiers 20 and 22, to compare the voltage drop across the lower temperature sensor to that across a fixed resistor R8 carrying a current established by R7 and the bridge excitation voltage. The resistance of R8 is selected to be approximately equal to that of the temperature sensors $RT_L$ and $RT_H$ at the middle of the temperature range of interest. In order to accomplish this, the voltage at the "high" end of the standard resistor R8 is applied to the negative input terminal of amplifier 20 while the voltage at the "high" side of sensor $RT_L$ is applied to the positive input terminal of amplifier 20; i.e., the negative input terminal of amplifier 14 is connected directly to the positive input terminal to amplifier 20. The output signal from amplifier 20 is applied as a first input to amplifier 22. The signals from the "lower" ends of sensor $RT_L$ and standard resistor R8 are applied as further inputs to amplifier 22 whereby the amplifier sums the output of amplifier 20 with the differential signal from the lower ends of the standard and sensor. When the voltage gain for the differential pair of inputs to amplifier 22 equals the product of the voltage gain of the negative-summing input to amplifier 22 and the voltage gain of amplifier 20, the peak-to-peak value of the resulting square wave signal from amplifier 22 is proportional to the difference in voltage drops across just $RT_L$ and R8, and is independent of the voltage drops across the cable (and connector) resistances. This output signal will be indicative of the variation in temperature of the sensor $RT_L$ from the middle of the temperature range of interest and, thus, will be a measure of the absolute temperature to which $RT_L$ is exposed. The standard resistor R8 as well as resistor R7 must, of course, be stable.

Resistor R7 serves to establish the operating current through the "standard" resistor R8. The standard resistor R8 will be a precision component, typically ±0.1% tolerance, which has a maximum temperature coefficient of only 1/ppm. Use of a precision resistor eliminates the necessity of locating the standard in a constant temperature environment. Resistor R9 serves to produce a voltage drop which approximately equals that developed across the grounded cable resistance $RW_{L3}$ to essentially balance amplifier 22. Thus, in the preferred embodiment, resistance of R9 was made approximately equal to that of $RW_{L3}$. Also in a preferred embodiment of the invention, resistance R7 was equal to resistors R4 and R6 and the ratio of the resistance of R7 to that of standard R8 was such that the voltage drop across resistor R8 equalled the voltage drop across sensor $RT_L$ at the temperature for which the zero output voltage is desired. This temperature would typically be at the mid-point of the working temperature range. Amplifier 20, as well as amplifiers 14 and 16, may be standard, commercially available differential-input instrumentation amplifiers. Amplifier 22 will be an operational amplifier such as, for example, a Fairchild type 725C with appropriately selected external passive circuit components whereby the negative input terminal to the amplifier will behave as a summing junction.

While a preferred embodiment has been shown and described, various modifications and substitutions may be made thereto without departing from the spirit and scope of the invention. Accordingly, it is to be understood that the present invention has been described by way of illustration and not limitation.

What is claimed is:

1. Apparatus for measuring a temperature differential between two spacially displaced points comprising:
   first temperature sensor means, said first sensor means including a temperature responsive resistance element;
   second temperature sensor means, said second sensor means including a temperature responsive resistance element;
   means for connecting said sensor means resistance elements in adjacent legs of a bridge circuit, said bridge circuit having an excitation terminal;
   a source of excitation current for said bridge circuit, said current source having a pair of opposite polarity terminals;
   means for alternately connecting said bridge circuit excitation terminal to said opposite polarity current source terminals;
   first differential amplifier means connected to first ends of each of said sensor means resistance elements, said first amplifier means providing a signal commensurate with the voltage difference at the said first end of said resistance elements;
   second differential amplifier means connected to second ends of each of said sensor means resistance elements, said second amplifier means providing a signal commensurate with the voltage difference at the said second ends of said resistance elements; and means connected to said first and second amplifier means and responsive to said signal commensurate with voltage difference for providing an output signal indicative of the difference in the temperatures to which said sensor means are exposed.

2. The apparatus of claim 1 wherein said means for connecting said sensor means resistance elements in a bridge circuit comprises:

means connected in the excitation path for each of said resistance elements to compensate for differences in excitation path resistance resulting from variations in the distances from said source and said amplifier means to each of said sensor means.

3. The apparatus of claim 2 wherein said means for compensating for excitation path resistance differences comprises:

a pair of compensating conductors connected in series in each excitation path, said compensating conductors providing identical conductor lengths in each excitation path.

4. The apparatus of claim 1 wherein said output signal providing means comprises:

summing amplifier means.

5. The apparatus of claim 3 wherein said output signal providing means comprises:

summing amplifier means.

6. The apparatus of claim 1 further comprising:

means for measuring the absolute temperature at one of said sensors.

7. The apparatus of claim 6 wherein said absolute temperature measuring means comprises:

means for comparing the voltage drop across one of said sensor means resistance elements with the voltage drop across a fixed known resistance.

8. The apparatus of claim 3 further comprising:

means for comparing the voltage drop across one of said sensor means resistance elements with the voltage drop across a fixed known resistance to generate a signal commensurate with the absolute temperature at the sensor means including said one resistance element.

9. The apparatus of claim 3 further comprising:

means including a resistor having a fixed known value;

means for connecting a first end of said fixed resistor to said bridge circuit excitation terminal;

third differential amplifier means, said third amplifier means having a first input terminal connected to said first end of said fixed resistance;

means connecting the first end of said one of said temperature sensor means resistance elements to a second input terminal of said third amplifier means whereby said third amplifier means will provide an output signal commensurate with the differences in the voltages at first ends of said temperature responsive resistance elements and said fixed resistor;

means connected to the second ends of said one of said temperature responsive resistance elements and said fixed resistor and to the output signal provided by said third amplifier means for generating a signal commensurate with the difference in the voltage drops across said fixed resistance and said one of said temperature responsive resistance elements, said generated signal being commensurate with the absolute temperature at said one of said temperature responsive resistance elements.

10. The apparatus of claim 9 wherein said means for providing an output signal indicative of the difference in temperatures to which said sensor means are exposed comprises:

an inverting summing amplifier.

* * * * *